United States Patent [19]
Cline

[11] Patent Number: 5,925,252
[45] Date of Patent: Jul. 20, 1999

[54] WATER-DISSOLVABLE BIOREMEDIATION DEVICE AND METHOD OF USE

[75] Inventor: Kenneth King Cline, Sharpsburg, Ga.

[73] Assignee: Innovative Formulations, Peachtree City, Ga.

[21] Appl. No.: 08/984,475

[22] Filed: Dec. 3, 1997

Related U.S. Application Data

[51] Int. Cl.$^6$ ..................................................... C02F 3/00
[52] U.S. Cl. ......................... 210/606; 210/610; 210/170; 210/206; 435/175
[58] Field of Search ..................................... 210/606, 610, 210/611, 170, 206, 209; 435/174, 175

[56] References Cited

U.S. PATENT DOCUMENTS

| | | |
|---|---|---|
| 4,670,149 | 6/1987 | Francis . |
| 4,810,385 | 3/1989 | Hater ........................................ 210/606 |
| 4,925,564 | 5/1990 | Francis . |
| 5,171,687 | 12/1992 | Muller et al. ............................. 210/610 |
| 5,348,803 | 9/1994 | Schlaemus et al. ...................... 210/610 |
| 5,516,687 | 5/1996 | Perez et al. .............................. 210/610 |

OTHER PUBLICATIONS

Compilation titled "Patents Referencing 2,987,483", by K. Cline, 9 pages.
Biographical information and exemplary claim re: Patent No. 5,397,700, 1 page.
Biographical information and exemplary claim re: Patent No. 5,554,291 from IBM patent server.
Biographical information and exemplary claim re: Patent No. 4,940,539 from IBM patent server.
Biographical information and exemplary claim re: Patent No. 5,609,753 from IBM patent server.
Biographical information and exemplary claim re: Patent No. 5,522,985 from IBM patent server.
Biographical information and exemplary claim re: Patent No. 5,516,687 from IBM patent server.
Biographical information and exemplary claim re: Patent No. 5,344,557 from IBM patent server.
Biographical information and exemplary claim re: Patent No. 5,271,829 from IBM patent server.
Biographical information and exemplary claim re: Patent No. 5,171,687 from IBM patent server.
Biographical information and exemplary claim re: Patent No. 4,911,832 from IBM patent server.
Biographical information and exemplary claim re: Patent No. 4,797,208 from IBM patent server.

*Primary Examiner*—Christopher Upton
*Attorney, Agent, or Firm*—Bernstein & Associates P.C.

[57] ABSTRACT

A bioremediation device and process for remediation of waste collection systems. The present invention preferably comprises an bioactive element having an outer and an inner portion. The concentration of the bioactive element in the outer portion differs from that of the inner portion so that the concentration is greatest when the waste material is first exposed to the outside of the element and diminishes while the solid dissolves in the waste material. The outer portion is disposed about the inner portion such that substantially all of the outer portion is dissolved for delivery of the bioactive element into the waste material before dissolution of the inner portion occurs. The outer portion has a relatively great bioactive effect for remediating the waste material and the inner portion has a relatively lesser bioremediating effect for maintaining the waste material in the collection systems.

16 Claims, 2 Drawing Sheets

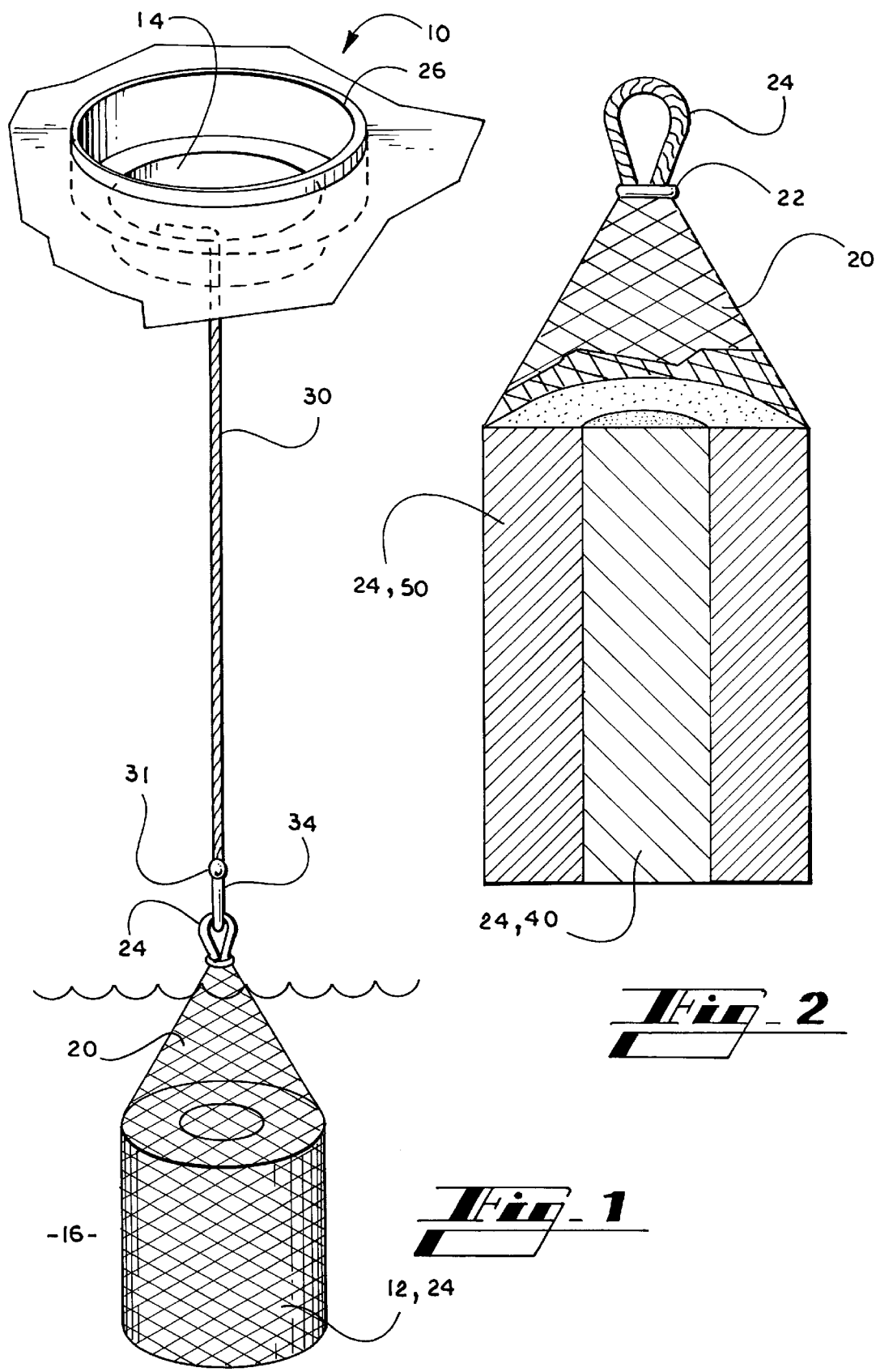

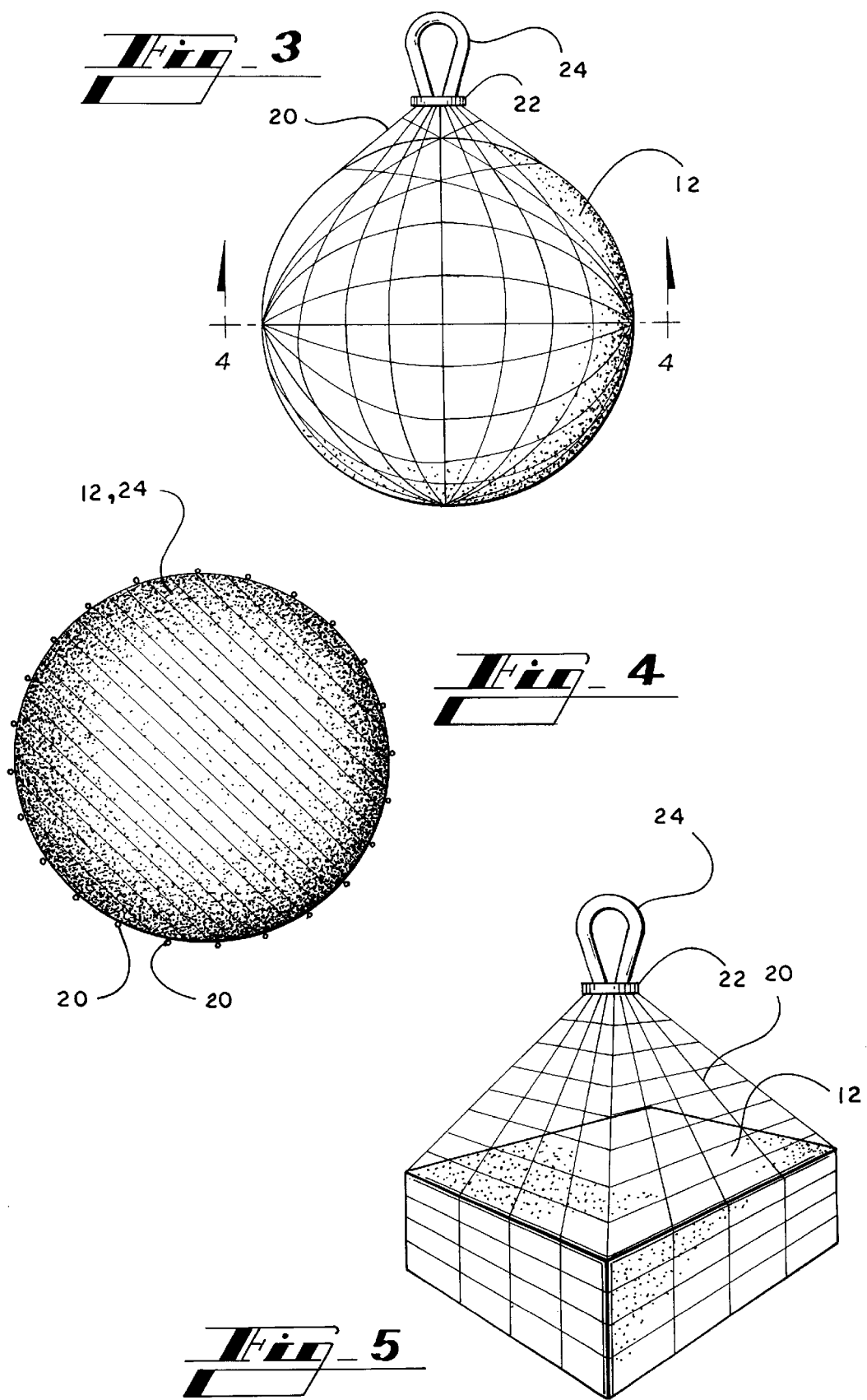

WATER-DISSOLVABLE BIOREMEDIATION DEVICE AND METHOD OF USE

FIELD OF THE INVENTION

The present invention relates to remediation of waste water collection systems such as sewage systems and grease traps. This invention more particularly pertains to a bioremediation device and a process for initially reducing the grease and other organic materials in the collection system and then maintaining the remediation effect in the collection system.

BACKGROUND OF THE INVENTION

Description of Related Art

Modern progress has necessitated the development and use of waste collection systems as an alternative to unabated sewage disposal. Such collection systems are necessitated by the inherent limitations of residential and commercial sewage systems. Most of today's sewage systems are not able to accept either the quantities or the varying types of raw sewage produced from residential and commercial facilities. Simply, the output of residential and commercial sewage has outpaced the acceptable capacity for these sewage systems. Moreover, the contents of the sewage itself often makes unrestricted disposal and collection impractical or outright hazardous.

As a result of the increasing and undue strain placed on community sewage systems, limitations have been placed on both the quantities and types of waste which may be properly disposed in these systems. For example, state and local municipalities have placed limitations on the quantities of oil and grease which may be introduced into municipal sewage collection systems. Most commercial businesses are required to maintain a grease trap to collect the grease, thereby preventing most of the grease from entering the sewage system. The grease or other organic waste is collected in the trap where the organic material will naturally decompose or eventually be removed and reclaimed along with the non-organic waste. However, in an effort to minimize both the accumulation as well as efforts to remove the collected waste in these traps, the use of remediation devices has been implemented that introduce bacterial supplements into the collection system. The bacterial supplements reduce the amount of grease and maximize organic decomposition.

Presently, commercially available bioremediation devices are commonly used to remediate waste collections systems such as sewage systems and grease traps. The term "bioremediation" refers to a biological process wherein grease and other organic matter are converted to carbon dioxide and water. However, these known remediation devices inadequately address today's needs. Such remediation devices are unsuited for reducing the accumulated waste materials to a level where the collection system can then be adequately maintained. Moreover, as a result of the increasing use of waste collection system, the demand for removal of accumulated waste has equally increased. Therefore, extended periods of time between reduction and/or removal of the accumulated waste often exacerbates waste handling problems.

It is known to place a bacterial incubator in a collection system to facilitate organic reduction of waste materials. For example, U.S. Pat. Nos. 4,670,149 and 4,925,564 to Frances disclose bacterial incubator devices providing a large surface area intended to facilitate bacterial growth within the sewage collection system. The bacteria enter the system by passing through the enclosure and are intended to indiscriminately attack the contents of the collection system without regard to distinguishing particular contents or providing relatively rapid short-term bioremediation followed by maintenance of remediating bacteria and enzymes in the system.

In response to the realized inadequacies of these earlier remediation devices, it became clear there is a need for a bioremediation device which will individually address the waste material as well as the waste water throughout the collection system. This device must have a variable capacity to provide relatively rapid introduction of bacteria and enzymes, or both, into the waste water to initiate remediation of organics such as grease or the like. Once the organic waste materials have been substantially reduced, the remediation device should maintain remediating bacteria or enzymes in the waste water in the collection system by replenishing the remediating agents that are diminished or flow out the system.

BRIEF SUMMARY OF THE INVENTION

The present invention alleviates or solves the above-described problems in the prior art by providing an improved bioremediation device and process. The present device satisfies the need for a more effective remediation device having a variable capacity to initiate relatively rapid remediation of organic waste materials such as grease and accumulated surface scum, and to maintain remediation in the waste water in a system.

In accordance with the invention, this object is accomplished by providing a remediation device of the above kind in that a bioactive element is deposited within the collection system. The bioactive element has active ingredients of variable strength and concentration. The bioactive element is strongest when initially placed within the waste collection system, in order to provide a relatively powerful remediation device to reduce organic waste materials, such as grease or scum, throughout the system. The effect of the bioactive element diminishes as a result of the waste material being reduced. However, the bioactive element then yields bacteria or enzymes in sufficient concentration to maintain bioremediation in the collection system. Expended bioactive elements are periodically replaced so that the system is continuously maintained.

Preferably, the bioactive element of the present invention comprises a dissolvable outer portion of active ingredients and a dissolvable inner portion of active ingredients. In comparison to the ingredients of the inner portion, the ingredients of the outer portion are stronger or more concentrated, and thus are more effective removing waste materials such as scum near the surface of the collection system. The inner portion is positioned within the outer portion such that once the majority of the surrounding outer portion has dissolved into the collection system, the inner portion of reduced concentration relative to the outer portion becomes exposed to the contents of the collection system.

The bioremediation device comprising a bioactive element that is soluble in the waste material and has at least one active ingredient present in a variable concentration, the variable concentration being greatest substantially at the outside of said element and being least within the element, so that the bioremediation effect of the element is greatest when the waste material is first exposed to the outside of the element and lessens while the element dissolves in the waste materials, whereby the outside of the bioactive element has a relatively great bioactive effect for remediating the waste material and the inside of the bioactive element has a relatively lesser bioremediating effect for maintaining the waste material in the collection system.

A remediation device formed in accordance with the present invention has a number of advantages. An important advantage of the novel remediation device is its ability to initially treat the organic contents of the waste container with a relatively high concentration of bioremediating agents.

Accordingly, an object of this invention is to provide an improvement which overcomes the aforementioned inadequacies of the prior art devices and provides an improvement which is a significant contribution to the advancement of the remediation device art.

Still another object of the present invention is to provide a structurally simple and economical device for remediating waste collection systems.

Yet another object of the present invention is to provide a bioremediation device for biological degradation of a predetermined waste material in a collection system.

The foregoing has broadly outlined some of the more pertinent objects and features of the invention. These should be construed to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims.

It should be appreciated by those skilled in the art that the conception and the disclosed specific embodiments may be readily utilized as a basis for modifying or designing other structures or methods for carrying out the same purposes of the present invention. It should also be realized by those skilled in the art that such equivalent constructions do not depart from the spirit and scope of the invention as set forth in the appended claims.

For a more succinct understanding of the nature and objects of the present invention, reference should be directed to the following detailed description taken in connection with the accompanying drawings.

BRIEF DESCRIPTION OF THE DRAWINGS

FIG. 1 is a front perspective view of a preferred embodiment of the present invention suspended in a waste collection system.

FIG. 2 is a front cross-section view of the bioactive element in the embodiment of FIG. 1.

FIG. 3 is a front elevation view of the present invention in an alternative embodiment.

FIG. 4 is a cross section view taken along line 4—4 of FIG. 3.

FIG. 5 is a front perspective view of the present invention in another alternative embodiment.

DETAILED DESCRIPTION OF THE PREFERRED EMBODIMENT

As shown in FIG. 1, a bioremediation device shown generally at 10 comprises a dissolvable bioactive element 12 suspended from the top of a waste collection system for collecting waste material 16 such as waste water and accumulated surface scum including oil and grease. The device is immersed in the waste material. The bioactive element 12 is enclosed within a netting 20 which allows the active ingredients 24 of that element to dissolve directly into the waste material. The bioactive element is suspended from the collection system on a flexible line 30 having a first end 31 and a second end 32. The flexible line is preferably of a material that will permanently retain the bioactive element in the collection system until the device 10 is removed therefrom by the user.

The first end 31 of the line includes a clasp 34 for detachably securing to a loop 24 formed from the netting 20. A tie 22 (FIG. 2) gathers a portion of the netting above the bioactive element to form the loop 24. The netting preferably is made of any suitable foraminous material permits substantially unimpeded exposure of the bioactive element to the waste material and waste water within the collection system. Moreover, in the preferred embodiment, the netting should be able to be shaped in order to form the loop. The tie may be of any suitable material such as a plastic tie or ring which will tie off a portion of the netting.

The second end 32 is detachably secured to a cover 26. To position the bioremediation device of the present invention within the collection system, the bioactive element within the netting is lowered into the collection system on the flexible line 30 through an opening 14 in the top of the collection system. The cover 26 closes an existing access opening to a grease trap or similar collection system.

Preferably, the weight of the device is approximately 10 pounds. The weight of the bioremediation device keeps the bioactive element submerged in the waste material as a result of having a specific gravity greater than 1. However, as the bioactive element dissolves, the device will float to the surface as a result of reduced weight and the natural buoyancy of the netting, to indicate the bioactive element has almost substantially been consumed and that the bioactive element has therefore approached the end of its useful life. Thus, the present embodiment provides an easy way of determining the bioactive element change-out time and to calculate the amount of product needed to treat a given collection system.

In order to remove the expended bioremediation device 10 once the bioactive element has substantially dissolved, the flexible line and netting are pulled back through the opening in the collection system. The spent device 10 may be replenished by placing a fresh such device through the opening.

The variable concentration of at least one active bioremediation ingredient differs throughout the bioactive element 12. It is an important aspect of the invention that a portion of the bioactive element be operative at a relatively high concentration to initially reduce the accumulated waste material 16, and at least another portion be operative at a relatively lower concentration to maintain a lower amount of bacteria and enzymes in the collection system once the waste material has been substantially reduced. To initially reduce the waste material 16, the concentration is significantly greater than the concentration required to maintain the system once the waste materials are initially reduced. The bioactive element of the present invention may be implemented by bacteria and/or enzymes having a capacity for organic reduction and organic maintenance.

As illustrated in FIG. 2, the bioactive element 12 comprises an inner portion 40 and an outer portion 50. The outer portion as shown in the embodiment of FIGS. 1 and 2 is a cylindrical element in the shape of an annulus having an axial hole therethough. The inner portion is a solid that fills the axial hole of the outer portion. The outer portion surrounds the inner portion, thereby limiting the ability of the inner portion to dissolve in the waste material until the outer portion is substantially dissolved. The outer portion preferably is formed from a mold of the desired dimensions, and the outer portion then acts as a mold when forming the inner portion.

In an actual embodiment, the outer portion is approximately 6.5 to 7.0 inches in height and has the shape of an annulus having a thickness of approximately 6 inches. The overall radius of the element is approximately 3 inches wide, thereby leaving an inner radius of 1.5 inches for receiving the inner portion. Thus, the inner portion is sized by the inner confines of the outer portion. Preferably, the inner portion is also 6.5 to 7.0 inches in height and 3 inches wide. As can best be seen in FIG. 2, portions of the inner portion are exposed or revealed from within the outer portion prior to use. The ends of the inner portion are exposed prior to being deposited and dissolved in the waste collection system.

In the preferred embodiment, the outer portion and the inner portion each comprise a blend of biodegradable surfactants which are able to easily structurally degrade by a natural degradation process. A portion of the outer portion may be a surfactant commonly known as forty percent solution sodium 2-ethylhexyl sulfate which is an anionic surfactant carrying a negative charge on the hydrophilic portion in the form of sulfate. This surfactant should preferably make up 8% to 15% by weight of the outer portion. The chemical structure of this surfactant is:

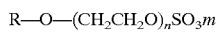

where R=fatty alkyl or alkylaryl group, N=moles of ethylene oxide, and m=counter ion: Na, $NH_4$, Mg, triethanolamine, etc. The market name for this surfactant is Rhodapon BOS™, which can be purchased through the Rhone Poulenc Company at 7500 Prospect Plains Road, Cranbury, N.J. 08512 USA.

Also included in the blend making up the outer portion is 1% to 5% by weight of sodium alpha olefin sulfonate having the chemical structure:

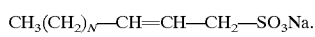

This surfactant may be acquired under the name Bioterge AS-90™, which can be purchased through the Stephan Company at Edens and Winnetka Roads, Northfield, Ill. 60093 USA.

Additionally, the outer portion of the blend contains a blended surfactant of 2% to 4% by weight having the make up of a disodium wheat germamphodiacetate which is known under the name Mackam 2W, produced through the McIntyre Group Ltd. at 1000 Governors Highway, University Park, Ill. 60466 USA.

A 3% to 4% by weight portion of sodium thiosulfate anhydrous powder is also part of the outer portion in a preferred embodiment. Also included in the blend of the outer portion is forty percent solution powdered bacteria with a count of no less than 50 billion colony forming units (CFUs) per gram. The preferred bacteria is facultative in nature, in that it has the ability to grow with or without the presence of oxygen. The preferred genesis of the strand of bacteria used in the present invention is, but is not limited to, *Bacillus Licheniformis, Bacillus Subtilis, Bacillus Amyloliquiefaciens, Bacillus Polymyxa, Pseudomonas Aeruginosa, Pseudomononas Statzeri, Pseudomonas Fluoresceni, Escherichia Hermanii, Bacillus Cereus, Bacillus Thuringiensis, and Bacillus Meg'afarium.*

The blend of the outer portion may further include a citric acid powder from 1% to 2% by weight and a vitamin package of approximately 1% to 3% by weight. The vitamin package may comprise, but is not limited to, vitamins A, D, E and K. The remaining portion of the blend making up the outer portion should be made up of sodium sulfate anhydrous powder.

The blend of the outer portion is prepared by blending together the ingredients described above using a mixing apparatus (not shown) capable of mixing viscous liquids. The ingredients of the outer portion are mixed for no less than 30 minutes. The blend is then deposited into the mold designed for manufacturing the outer portion with the aforementioned dimensions where it is allowed to set up for no less than 3 hours.

In a preferred embodiment, the inner portion should similarly comprise the same ingredients and in the same proportions with the following exceptions. The inner portion should comprise 8% to 15% by weight of forty percent solution sodium 2-ethylhexyl. Moreover, the inner portion should comprise of twenty percent solution powdered bacteria with a count of no less than 50 billion CFUs per gram. The present invention is formulated to give the maximum strength dosage of bacteria through the outer portion. The blend of the inner portion is also mixed in a mixing apparatus that is capable of mixing viscous liquids. The inner portion blend is also mixed for no less than 30 minutes and then is dispensed into the center of the outer portion that was previously prepared and which now functions as a mold for forming the inner portion. The inner portion should be allowed to set up within the outer portion for no less than 3 hours.

Preferably, the bioactive element is configured to dissolve in approximately 90 days within systems having flow under 50,000 gallons per month. For systems having a flow of up to 100,00 gallons per month, the element should dissolve in approximately 60 days. For systems having a flow of up to 150,000 gallons per month, the element should dissolve in approximately 30 days.

It should be understood that the nature and amounts of the ingredients, as well as the physical dimensions of the device, are exemplary of the preferred embodiment, and are not meant to limit the practice of the present invention.

The bioactive element of the present invention is not limited to any particular shape. As can be seen in FIGS. 3 and 5, the present invention may be spherical or rectangular. FIG. 4 is a cross-sectional view of the spherical bioactive element shown in FIG. 3. FIG. 4 shows, in particular, that the variable concentration varies in a gradual manner, unlike the stepped variation from outer to inner portions shown in FIGS. 1 and 2 with the concentration greatest substantially at the outside of the element and least at or near the innermost part of the solid.

The use of the bioremediation device 10 as described above constitutes an inventive method of the present invention in addition to the bioremediation device 10 itself. In practicing the method of bioremediating a waste collection system with the bioremediation device 10 as described above, the steps include providing a bioactive element of the type described above into the waste material. The method then includes the step of reducing the waste materials in the collection system as described above. The method also includes the step of maintaining the waste material in the collection system as described above. The step of reducing the waste material may comprise dissolving the outer portion of the bioactive element or charge and the step of maintaining the waste material may comprise dissolving the inner portion of the bioactive element or charge. The process of the present invention rejuvenates the waste collection system.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

What is claimed is:

1. A bioremediation device for biological degradation of a predetermined waste material in a collection system, said bioremediation device comprising:

a bioactive element that is soluble in the waste material and has at least one active ingredient present in a variable concentration, said variable concentration being greatest substantially at the outside of said element and being least within said element, so that the bioremediation effect of said element is greatest when the waste material is first exposed to the outside of said element and lessons while said element dissolves in the waste materials, whereby said bioactive element has a relatively great bioactive effect substantially about its outside for remediating the waste material and a relatively lesser bioremediating effect substantially within itself for maintaining the waste material in the collection system.

2. The bioremediation device as claimed in claim 1 wherein:

said bioactive element has an outer portion and an inner portion;

said concentration of said bioactive element in said outer portion differs from said concentration of said bioactive element in said inner portion; and said outer portion is disposed about said inner portion such that substantially all of said outer portion is dissolved for delivery of said bioactive element into the waste material before dissolution of said inner portion occurs.

3. The bioremediation device as claimed in claim 1 wherein said bioactive element comprises biodegradable surfactants.

4. The bioremediation device as claimed in claim 1 wherein said bioactive element comprises at least one of bacteria and enzymes operative for organic reduction.

5. The bioremediation device as claimed in claim 1 further comprising means for suspending said bioremediation device immersed in the waste material in the collection system, said means for suspending permitting substantially unimpeded exposure of the waste material to said bioactive element and retaining said bioactive element in the collection system.

6. The bioremediation device as claimed in claim 5 wherein said means for suspending comprises a netting, said netting encompassing said bioactive element.

7. The bioremediation device as claimed in claim 6 wherein said means for suspending further comprises a flexible line having first and second ends, said first and second ends detachably coupled to said netting and to the collection system respectively, so as to suspend said bioremediation device in the waste material within the collection system.

8. A bioremediation device for biological degradation of accumulated waste materials in a collection system, said bioremediation device comprising:

a dissolvable bioactive element to be disposed within the waste material of the collection system, said bioactive element having a variable concentration being strongest upon initial contact with the waste materials in the collection system in order to reduce the amount of accumulated waste materials, and said bioactive element dissolving and said variable concentration weakening over time such that once the waste materials have been substantially reduced the collection system may be maintained.

9. The bioremediation device as claimed in claim 8 wherein said bioactive element comprises:

a dissolvable outer portion of active ingredients; and a dissolvable inner portion of said active ingredients, said inner portion configured to be received in said outer portion such that the majority of said inner portion is exposed upon said outer portion being substantially dissolved away, said outer portion having a greater concentration than said inner portion such that the collection system is shocked upon said bioremediation devise being immersed in the waste material and said outer portion and said inner portion reducing said waste materials and maintaining the collection system by dissolving in the collection system respectively.

10. The bioremediation device as claimed in claim 9 wherein said active ingredients comprise biodegradable surfactants.

11. The bioremediation device as claimed in claim 9 wherein said bioactive element comprises at least one of bacteria and enzymes operative for organic reduction.

12. The bioremediation device as claimed in claim 9 further comprising means for suspending said bioremediation device immersed in the waste material in the collection system, said means for suspending permitting substantially unimpeded exposure of the waste material to the bioactive element and retaining said bioactive element in the collection system.

13. The bioremediation device as claimed in claim 12 wherein said means for suspending comprises a netting, said netting encompassing said bioactive element.

14. A process for bioremediating a waste collection system containing waste materials, the method comprising the steps of:

providing to the waste collection system a bioactive element that is soluble in the waste material and has at least one active ingredient present in a variable concentration, said variable concentration being greatest substantially at the outside of said element and being least within said element, so that the bioremediation effect of said element is greatest when the waste material is first exposed to the outside of said element and lessens while said element dissolves in the waste materials, whereby said bioactive element has a relatively great bioactive effect substantially about its outside for remediating the waste material and a relatively lesser bioremediating effect substantially within itself for maintaining the waste material in the collection system.

15. The process as claimed in claim 14 wherein the step of reducing the waste materials comprises dissolving an outer portion of said bioactive element.

16. The process as claimed in claim 14 wherein the step of maintaining the waste water comprises dissolving an inner portion of said bioactive element.

* * * * *